March 20, 1951      R. L. MEADOWS      2,545,584
HEAVY-DUTY TRAILER AND TRACTOR HITCH
Filed Aug. 31, 1949      4 Sheets-Sheet 1
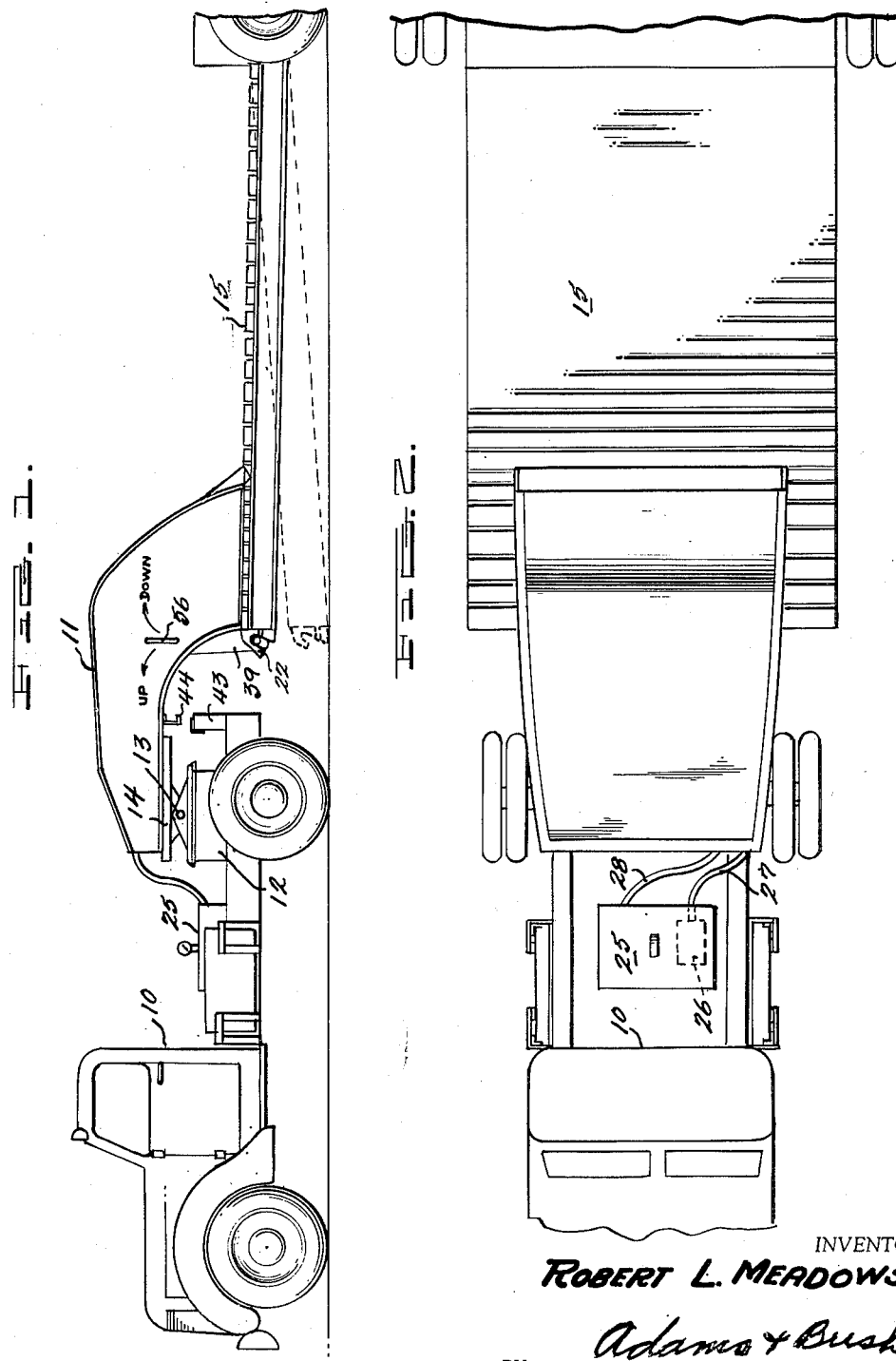
INVENTOR
ROBERT L. MEADOWS
BY Adams & Bush
ATTORNEYS March 20, 1951  R. L. MEADOWS  2,545,584
HEAVY-DUTY TRAILER AND TRACTOR HITCH
Filed Aug. 31, 1949  4 Sheets-Sheet 2
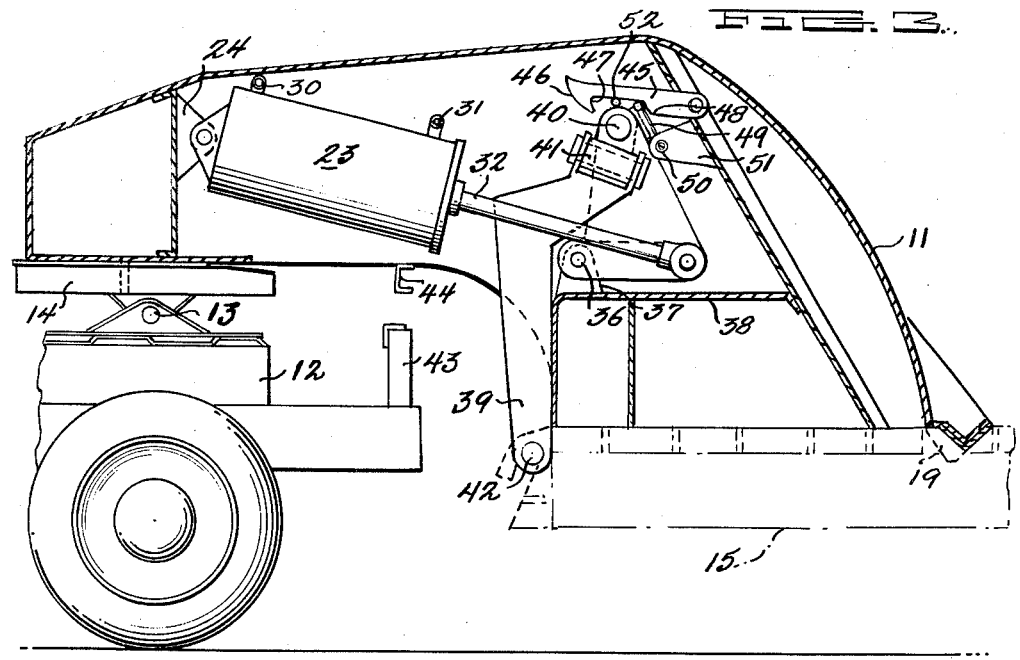
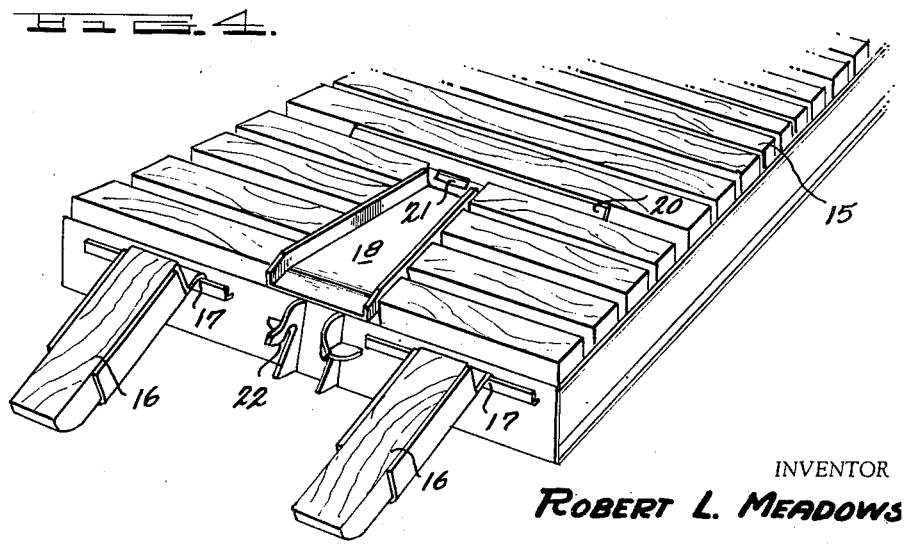
INVENTOR
ROBERT L. MEADOWS
BY Adams & Bush
ATTORNEYS

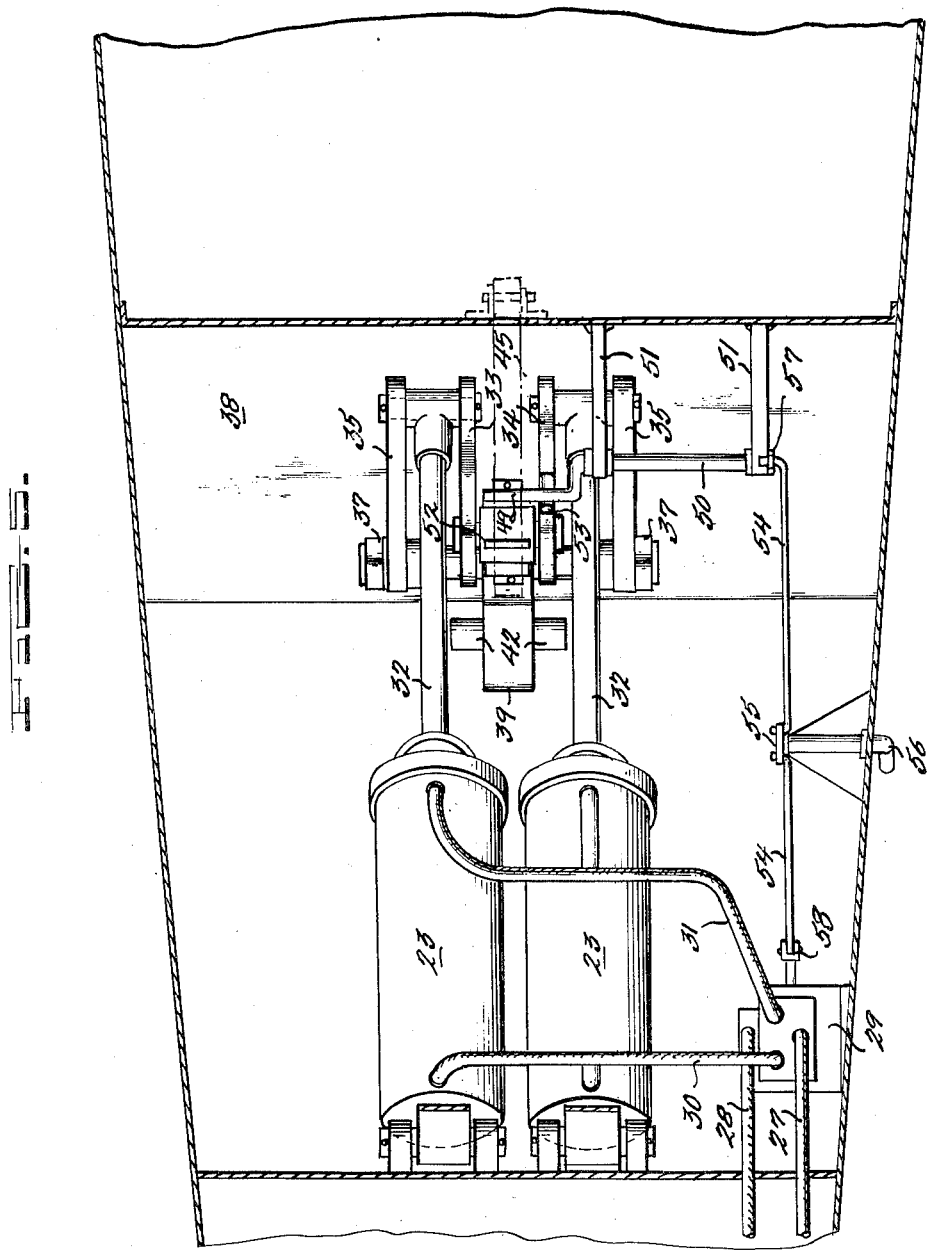

March 20, 1951 R. L. MEADOWS 2,545,584
HEAVY-DUTY TRAILER AND TRACTOR HITCH
Filed Aug. 31, 1949 4 Sheets-Sheet 4
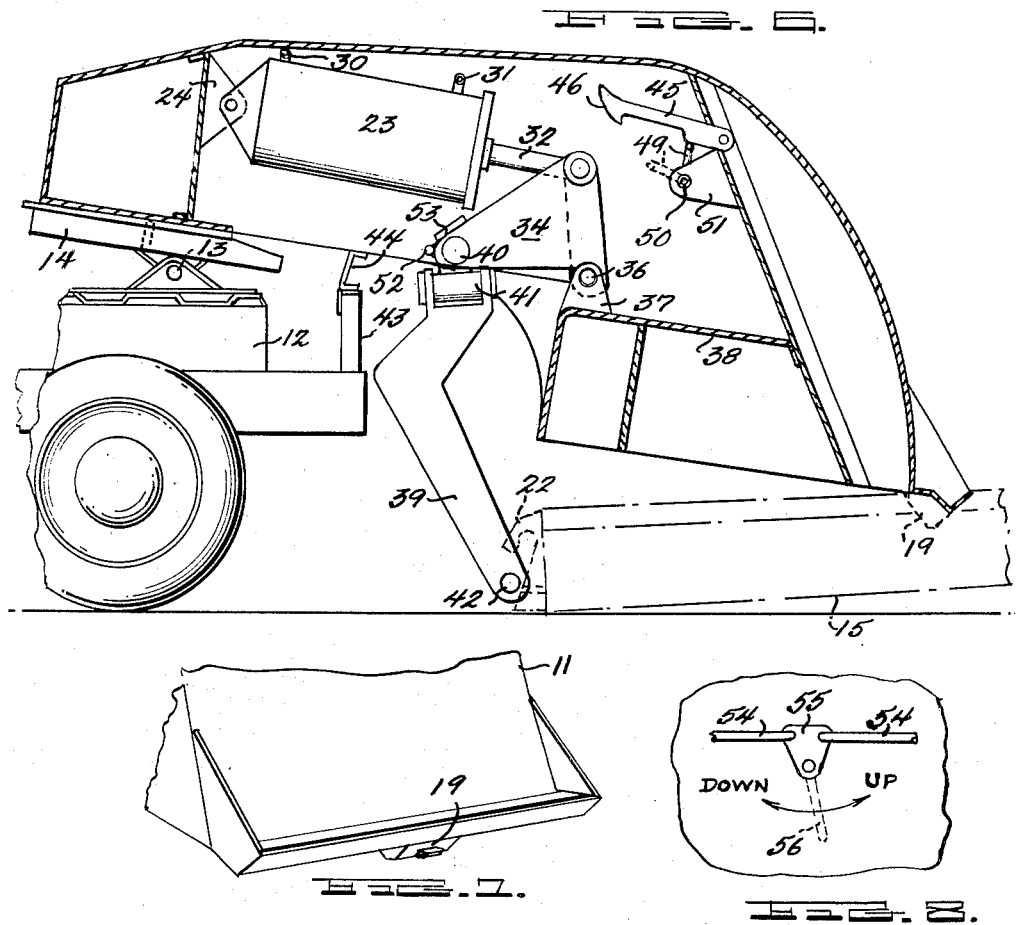
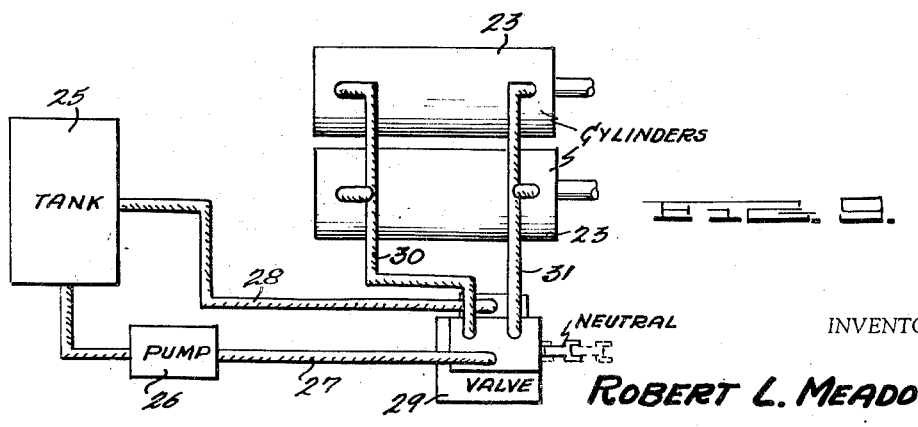
INVENTOR
ROBERT L. MEADOWS
BY Adams + Bush
ATTORNEYS Patented Mar. 20, 1951

2,545,584

UNITED STATES PATENT OFFICE 2,545,584

HEAVY-DUTY TRAILER AND TRACTOR HITCH

Robert L. Meadows, Arlington, Va.

Application August 31, 1949, Serial No. 113,443

10 Claims. (Cl. 280—33.05)

This invention relates to heavy duty trailers for transporting heavy machines and equipment, and aims to provide a greatly improved trailer and hitch mechanism for connecting it to a tractor or towing truck.

An important object of the invention is to provide a safe and reliable, hydraulically operated hitch of the type described in which the hydraulic mechanism is housed within a gooseneck on the rear end of the tractor or towing truck.

Another aim of the invention is to provide simple control means and a safety lock for a power operated hitch of the type described.

Another aim of the invention is to provide a heavy duty trailer having a flat platform adapted to be lowered to the ground at its forward end to permit self-propelled machines, road rollers, and other types of heavy vehicles or equipment to be loaded thereon, and having provision to be engaged and lifted into interlocking or coupling engagement with a gooseneck on a towing truck.

Still another aim of the invention is to provide power operated lifting mechanism in a hitch of the character set forth embodying important improvements on the type of hitch disclosed in my Patent No. 2,449,947, dated September 21, 1948.

Other aims and advantages of the invention will appear in the following specification, when considered in connection with the accompanying drawings, wherein:

Fig. 1 is a side elevation of a tractor or towing truck and trailer embodying the invention;

Fig. 2 is a top plan view of the truck and trailer shown in Fig. 1;

Fig. 3 is a fragmentary vertical sectional view showing the hydraulically operated lifting mechanism in the gooseneck of the towing truck;

Fig. 4 is a fragmentary perspective view showing the trailer lowered to its loading position;

Fig. 5 is a fragmentary top plan view of the hydraulic operating mechanism shown in Fig. 3, a portion of the gooseneck being shown in horizontal section;

Fig. 6 is a vertical sectional view, similar to Fig. 3, but showing the gooseneck in its lowered position to engage and lift the trailer to its locking or coupling position;

Fig. 7 is a fragmentary perspective view of the rear end of the gooseneck;

Fig. 8 is a detail view of control elements for operating the valve connected to the hydraulic cylinders; and Fig. 9 is a diagrammatic view showing the hydraulic cylinders and control valve therefor.

Referring more particularly to the drawings and the illustrative embodiment of the hitch and lifting mechanism shown therein, it is the purpose of this invention to provide a rugged, safe and powerful combination lift and tractor hitch with power means mounted in a gooseneck carried on an ordinary tractor or towing truck, and to eliminate the necessity of employing cables, winches, and the like, which are subject to breakage when used to lift extremely heavy loads, such as road building machinery, portable cranes, and other heavy equipment.

In Fig. 1, the improvements are shown as being applied to an ordinary towing truck 10 carrying a conventional form of gooseneck 11 mounted on the rear end portion of the chassis frame on a support 12, and capable of pivotal movement in a vertical plane about a transverse horizontal shaft 13. It is also capable of swinging movement in a horizontal plane on a conventional fifth wheel 14. The arrangement is such that the gooseneck can be lowered, as clearly shown in Fig. 6, to engage and pick up the front end of a trailer 15 having wheels at its rear end. In this instance, the trailer is of the flat platform type and its forward end is adapted to rest upon the ground, as shown in Figs. 1 and 4. Reinforced ramp members or skid boards 16 having hooked ends 17, are adapted to be connected to the forward end of the trailer frame to permit heavy machines to be driven onto the trailer platform. Herein, the platform is shown as comprising a series of wooden boards mounted on a structural steel frame. However, the floor can be made of any suitable material.

The forward end of the trailer platform is provided with a forwardly flared guiding channel 18 adapted to be engaged by a depending nose block 19 on the rear end of the gooseneck, the width of the nose block being somewhat narrower than the rear end of the guiding channel. At the rear end of the guiding channel there is shown a V-shaped cross channel 20 having a socket 21 to receive a locking projection on the rear end of the nose block when the towing truck is backed into its coupling position. The arrangement is such that the towing truck can easily be manipulated to guide the lowered gooseneck into the position shown in Fig. 6, and then the front end of the trailer is adapted to be lifted into its horizontal interlocking position with the gooseneck, as best shown in Figs. 1 and 3. If the rear end of the gooseneck happens to be lowered below the level of the front end of the platform, it will ride up on the ramps or skid boards 16.

The front end of the trailer is shown as having a pair of horizontally spaced hook members 22 (Fig. 4) adapted to be engaged by the power operated lifting means hereinafter described. When the trailer is thus raised, it will be understood that the connection of the gooseneck to the rear end of the towing truck will permit vertical and lateral swinging movements between the forward end of the trailer and the truck, due to towing movement over irregularities and around curves in the roadway.

Referring now to the power operating mechanism for lifting the trailer and coupling it to the gooseneck, a pair of hydraulic cylinders 23 are shown as being pivotally mounted at their forward ends for swinging movement in a vertical plane on ears 24 mounted on a cross beam near the forward end of the gooseneck. These hydraulic cylinders are shown as being supplied with hydraulic fluid from a tank 25 on the truck chassis, an ordinary hydraulic pump 26 being connected to the tank and a pair of hoses 27 and 28 lead from the pump and back to the tank through a well known type of continuous flow control valve 29. No claim is made to the control valve and it requires no detailed explanation. It is so connected to the hydraulic cylinders, by means of hoses 30 and 31, that the hydraulic fluid may be pumped into either end of the cylinders through the pump delivery hose 27 and the fluid in the opposite end is returned to the tank 25 through the return hose 28. A layout of the hydraulic connections is shown in Fig. 9, and requires no further explanation.

Referring further to the hydraulic mechanism for lifting the trailer into its interlocking engagement with the under side of the gooseneck, the hydraulic cylinders 23 are spaced apart horizontally and extend rearwardly from their connections to the ears or brackets 24, and piston rods 32 are shown as being connected to operate a pair of spaced bell cranks 33 and 34, respectively, having crank pins extending through them and crank arms 35 at one side of each of them, the bell cranks being mounted on shafts 36 journalled in upstanding ears 37 on a transverse supporting shelf in the form of a built-up beam 38 in the rear end portion of the gooseneck. The bell cranks are shown as being in the form of substantially triangular plates, and an articulated lifting bar or link 39 is mounted on a shaft or pin 40 extending through the bell cranks at their upper apex. The lifting bar or link is shown as being offset to permit it to be swung to the lifting position shown in Fig. 3, and is swingably mounted for lateral movement on a pivot pin 41, to provide for universal movement. This arrangement permits the lifting bar or link always to swing rearwardly relative to its vertical position by gravity to engage the lifting hooks 22 on the trailer. The lower end of the bar is shown as having trunnion pins 42 projecting through it and adapted to engage the hooks 22 at the forward end of the trailer. This is done automatically when the gooseneck is guided onto the trailer, as hereinbefore explained.

The throw of the bell cranks is such that, when they move to their lowermost position, shown in Fig. 6, the lower end of the lifting bar will reach a point near the ground level, thus allowing the trunnions to swing rearwardly into engagement with the hook members 22, as the towing truck is backed into its coupling position. The vertical movement of the gooseneck is limited by a stop member 43 mounted on the rear end of the truck chassis and an abutting transverse beam or member 44 on the lower side of the gooseneck, as shown in Figs. 3 and 6.

When the bell cranks are moved to their lifting position, as shown in Fig. 3, the shaft 40 carrying the lifting bar or link 39 is swung rearwardly to a point past the upper dead center. This arrangement prevents the enormous weight on the lifting bar from tending to swing the bell cranks forwardly, thereby preventing the front end of the trailer from being accidentally lowered or dropped while it is in transit.

In accordance with this invention, there is also provided safety locking mechanism for the bell cranks when they are in their lifted position, to avoid any possibility of dropping the trailer while it is in transit. Referring to Figs. 3, 5 and 6, there is shown a locking latch 45 pivoted at its rear end between two angle members and having a cam-shaped tip 46 at its forward end and a hook formed by a notch 47, the rear end of the notch also having a cam-shaped shoulder 48 to cooperate with a crank arm 49 on a rock shaft 50 operatively connected to control valve 29 and journalled in forwardly extending ears 51. The hook 47 is also adapted to drop by gravity into engagement with a bar or keeper member 52 welded or otherwise secured to the upper bearing of the lifting bar 39. When the latch member is lowered into the position shown in Fig. 3, it will be noted that the crank arm 49 on the rock shaft 50 is swung forwardly into the notched portion of the latch near the cam shoulder 48. The latch member is adapted to be lifted to the position shown in Fig. 6, as the control valve for the hydraulic motors is operated to lower the bell cranks and the lifting bar, and it is held in that position until the valve is again actuated to return it to its neutral position, when the crank arm 48 will be swung again to the position shown in Fig. 3, with the latch then supported substantially horizontally, ready to engage the keeper member 52. When the valve is again operated to lift the front end of the trailer from the position shown in Fig. 6, the rock shaft will swing the crank arm 49 forwardly to the dotted line position.

A shoulder 53 on the bell crank 34 is adapted to engage the crank arm 49 and return it to the position shown in Fig. 3, to operate the control valve automatically, moving it to its neutral position. To accomplish this, the control valve is of the reciprocating type and has a pair of links 54 pivotally connected to a triangular operating plate 55 actuated by a handle 56 projecting through one side wall of the gooseneck. The rear link is connected to an upstanding crank arm 57 on the rock shaft 49; while the front link is connected to a valve plunger 58. Referring to Fig. 8, the valve operating handle 56 is adapted to be moved in one direction to lower the bell cranks and in the opposite direction to raise the bell cranks, by supplying hydraulic fluid through the valve ports to the cylinders and returning the fluid therefrom to the tank, as hereinbefore described. The different positions of the valve plunger are clearly shown in Fig. 9. The operating handle will be down when the valve is in neutral position. It will be understood from the description of the operation of the rock shaft that the crank arm 49 on it will operate the valve plunger automatically when the bell cranks rise to the trailer lifting position, thereby stopping the hydraulic motors.

After the loaded trailer is coupled to the gooseneck and the towing truck is moved, the load on the lifting bar 39 will cause the bell cranks to be shifted forwardly, due to vibration, thus causing the keeper bar 52 to engage in the latch hook 45. When thus engaged, the safety latch will prevent the bell cranks from swinging forwardly any further. This slight movement of the bell cranks does not move the piston rod 32 of the hydraulic motors or the bar 39 any appreciable extent, because the bell cranks are so near their upper dead centers. Moreover, no appreciable stress is applied to the latch 45, because the bell cranks are held approximately on their upper dead centers. The latch prevents vibration from tending to swing the bell cranks forwardly and downwardly to release the front end of the trailer accidentally while it is in transit. When the latch is thus engaged with the keeper bar 52, it is impossible for an operator to move the valve control handle to its "down" position without first momentarily moving the handle to its "up" position, thereby causing the bell cranks to move rearwardly enough to disengage the keeper bar 52 from the notch in the latch. Then, the valve handle can be moved to its "down" position to disengage the hook, as has already been described.

When the gooseneck is coupled to the trailer, as shown in Fig. 3, the nose block 19 is interlocked with the socket 21 in the transverse channel 20 and the gooseneck is thus rigidly engaged with the trailer. However, it is free to swing laterally on the fifth wheel 14 and vertically relative to the towing truck on the transverse shaft 13 supporting the fifth wheel.

From the foregoing description, it will be understood that the hydraulic hitch is relatively simple in construction and safe in its operation. Practically any amount of power can be applied by the hydraulic motors to lift heavy loads without danger of breakage. Also, the automatic safety locking mechanism will prevent disastrous wrecks of the equipment. There are no obstacles in the form of upstanding projections on the platform of the trailer to prevent machines from being rolled onto the platform. Moreover, the mechanism can be applied to conventional types of goosenecks.

Obviously, the invention is not restricted to the particular embodiment thereof herein shown and described. Moreover, it is not indispensable that all of the features of the invention be used conjointly, since they may be employed advantageously in various combinations and subcombinations.

What is claimed is:

1. A hitch for connecting a towing truck and trailer comprising a gooseneck on the truck extending rearwardly therefrom; a trailer, including a platform having coupling means at its forward end and adapted to be lowered to the ground at its forward end; complementary coupling means on the rear end of the gooseneck adapted to be interlocked with the trailer; and power operated means, including a hydraulic motor housed in the gooseneck and a lifting arm connected and arranged to lift the forward end of the trailer into interlocking engagement with the gooseneck.

2. A hitch, as set forth in claim 1, wherein a cut-off valve controlling said hydraulic motor is connected to be operated by the lifting means as it reaches the coupling position.

3. A hitch, as set forth in claim 1, wherein the gooseneck is mounted for relative vertical and lateral swinging movement on the rear end of the truck; and said platform having a wedge-shaped channel for guiding the rear end of the gooseneck into interlocking engagement with the trailer when the truck is backed to its towing position.

4. A hitch, as set forth in claim 1, wherein the platform of the trailer has a forwardly flared guiding channel below its surface and the gooseneck has a downwardly projecting nose block slidably guided into said channel to coupling position and adapted to interlock with the trailer when the truck is backed to its coupling position.

5. A hitch, as set forth in claim 1, wherein the power operated means in the gooseneck comprises hydraulically operated mechanism having means to engage the front end of the lowered trailer platform when the towing truck is backed to its coupling position.

6. A hitch, as set forth in claim 1, wherein the power operated means in the gooseneck comprises a pair of horizontally spaced hydraulic motors hinged for vertical movement at the forward end portion of the gooseneck; a pair of bell cranks connected to be operated by said hydraulic motors; and an articulated lifting link carried by said bell cranks having means to engage the front end of the trailer when the towing truck is backed to coupling position.

7. Coupling means for a towing tractor and a platform trailer adapted to be lowered to the ground at its forward end, comprising in combination, a gooseneck on the tractor projecting rearwardly therefrom and mounted thereon for vertical and lateral swinging movements; a forwardly flared channel in the front end of the trailer having a coupling socket at its rear end; a depending nose block on the bottom of the rear end of the gooseneck adapted to engage the channel as the tractor is backed into its coupling position and having a projection to engage said socket; hydraulic lifting means, including a depending lifting bar adapted to be connected to the forward end of the trailer; and safety locking means in the gooseneck connected to prevent the lifting means from releasing the trailer after it is raised to its coupling position.

8. Coupling means for a towing tractor and a platform trailer, as set forth in claim 7, wherein the hydraulic means comprises a pair of hydraulic motors and bell cranks mounted in the gooseneck; valve means for controlling the operation of said motors; a rock shaft connected to the locking means; an actuating handle and links connected to the valve means and to said rock shaft; a crank on the rock shaft for actuating said locking means; and a contact member carried by said bell cranks connected to actuate said rock shaft and control valve to stop said hydraulic motors when the bell cranks reach their lifting position.

9. A hitch for connecting a towing truck and a trailer comprising a gooseneck on the truck extending rearwardly therefrom, a trailer including a platform having coupling means at its forward end and adapted to be lowered to the ground at its forward end; hydraulically operated lifting means in the gooseneck having a depending lifting bar; trunnions on the lower end of the lifting bar; hook members on the forward end of the trailer adapted to be engaged by said trunnions; guiding means for the rear end of the gooseneck below the level of the trailer platform; a socket member at the rear end of the guiding means; and a depending nose block on the rear end of the gooseneck adapted to be guided into interlocking engagement with the trailer as the towing truck is backed into towing position.

10. A hitch for connecting a towing truck and a trailer, as set forth in claim 9, wherein the hydraulically operated lifting means includes a pair of bell cranks connected to raise and lower the lifting bar, and wherein safety locking means is associated with the bell cranks to lock them in their raised position and prevent the coupling means from being accidentally disengaged in transit.

ROBERT L. MEADOWS.

REFERENCES CITED

The following references are of record in the file of this patent:

UNITED STATES PATENTS

| Number | Name | Date |
|---|---|---|
| 2,489,112 | Talbert | Nov. 22, 1949 |